United States Patent
Bang (10) Patent No.: US 9,389,449 B2
(45) Date of Patent: Jul. 12, 2016

(54) FLAT PANEL TYPE IMAGE DISPLAY DEVICE AND ASSEMBLY METHOD THEREOF

(71) Applicant: LG DISPLAY CO., LTD., Seoul (KR)

(72) Inventor: Moo-Wook Bang, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/557,091

(22) Filed: Dec. 1, 2014

(65) Prior Publication Data

US 2015/0181656 A1 Jun. 25, 2015

(30) Foreign Application Priority Data

Dec. 20, 2013 (KR) ........................ 10-2013-0160124

(51) Int. Cl.
*G02F 1/133* (2006.01)
*G02F 1/1333* (2006.01)

(52) U.S. Cl.
CPC *G02F 1/133308* (2013.01); *G02F 2001/13332* (2013.01); *G02F 2001/133314* (2013.01); *Y10T 29/49002* (2015.01)

(58) Field of Classification Search
CPC ... G02F 1/1333; G02F 9/00; G02F 29/49002; G02F 1/133308; G02F 2001/133314; G02F 2001/13332; Y10T 29/49002
USPC ..................... 349/56, 60, 62, 63, 65, 58, 187; 362/632, 633, 97.2
See application file for complete search history.

(56) References Cited

U.S. PATENT DOCUMENTS

| | | | |
|---|---|---|---|
| 6,593,979 B1 * | 7/2003 | Ha | G02F 1/133308 349/187 |
| 6,667,780 B2 * | 12/2003 | Cho | G02B 6/0086 349/58 |
| 6,847,417 B2 * | 1/2005 | Kim | G02B 6/0088 349/58 |
| 7,215,389 B2 * | 5/2007 | Shida | G02F 1/133308 349/58 |
| 7,819,573 B2 * | 10/2010 | Kawashima | G02B 6/0081 349/58 |
| 7,940,287 B2 * | 5/2011 | Kim | G02F 1/133308 345/102 |
| 8,008,570 B2 * | 8/2011 | Han | G02F 1/133308 349/58 |
| 2003/0122992 A1 * | 7/2003 | Hayashimoto | G02F 1/133308 349/58 |
| 2014/0002969 A1 * | 1/2014 | Hwang | H05K 5/0017 361/679.01 |

* cited by examiner

*Primary Examiner* — Donald Raleigh
*Assistant Examiner* — Kevin Quarterman
(74) *Attorney, Agent, or Firm* — Dentons US LLP

(57) ABSTRACT

Disclosed are a flat panel type image display device and an assembly method thereof which improve a coupling structure between a panel guide and a bottom case in a clear borderless design and thus increase coupling force therebetween and durability of the panel guide and the bottom case and enhance product reliability. The flat panel type image display device includes an image display panel, a panel guide having a loading part to which the image display panel is attached, and a side surface part bent from the loading part such that a plurality of first fixing holes and a plurality of second fixing holes are alternately disposed on the side surface part, and a bottom case having a plurality of first protruding fixing parts and a plurality of second protruding fixing parts alternately disposed on side surfaces thereof, and fixed to the inside of the panel guide.

10 Claims, 5 Drawing Sheets

FLAT PANEL TYPE IMAGE DISPLAY DEVICE AND ASSEMBLY METHOD THEREOF

This application claims the benefit of Korean Patent Application No. 10-2013-0160124, filed on Dec. 20, 2013, which is hereby incorporated by reference for all purposes as if fully set forth herein.

BACKGROUND OF THE INVENTION

1. Field of the Invention

The present invention relates to a flat panel type image display device having a clear borderless design without a case forming the external appearance thereof. More particularly, the invention relates to a flat panel type image display device, in which a coupling structure between a panel guide and a bottom case is improved so as to increase coupling force therebetween and durability thereof, and an assembly method thereof.

2. Discussion of the Related Art

As flat panel display devices have been used in monitors of personal computers, portable terminals, and various information apparatuses, a liquid crystal display device, a plasma display device, a field emission display device, an organic light emitting diode display device, etc. are employed.

In these flat panel display devices, a display panel displaying an image is loaded on a separate guide bracket or panel guide and is assembled with the inside of a front cover or a back cover forming the external appearance of a flat panel display device. Particularly, in the case of a liquid crystal display device, since a liquid crystal panel does not emit light spontaneously, a backlight unit is provided on the rear surface of the liquid crystal panel and then the liquid crystal panel is assembled with a panel guide and a back cover.

In order to satisfy various consumer demands for light weight and slimness as well as a fine design, flat panel type image display devices in which no front cover or top case forming the external appearance of the display device is formed, i.e., flat panel type image display devices having a clear borderless design, have been developed.

Conventionally, a flat panel type image display device having a clear borderless design is assembled by attaching an image display panel to a panel guide and coupling the panel guide with a bottom case in which a backlight unit is received.

However, according to light weight and slimness trends of flat panel type image display devices, panel guides and bottom cases are gradually changed to have light weight and slimness and thus, thicknesses of the panel guides and the bottom cases are reduced and coupling force therebetween is weakened.

In a general coupling structure between a panel guide and a bottom case, coupling hooks of the bottom case are coupled with coupling holes of the panel guide. However, if the thicknesses of the panel guide and the bottom case are reduced, the thicknesses and the areas of the coupling holes and the coupling hooks are reduced, coupling force therebetween is weakened. Thus, the panel guide and the bottom case are easily separated from each other due to even small impact and vibration, and durability of the panel guide and the bottom case is lowered.

SUMMARY OF THE INVENTION

Accordingly, the present invention is directed to a flat panel type image display device and an assembly method thereof that substantially obviate one or more problems due to limitations and disadvantages of the related art.

An object of the present invention is to provide a flat panel type image display device, in which a coupling structure between a panel guide and a bottom case is improved in a clear borderless design so as to increase coupling force therebetween and durability of the panel guide and the bottom case, and an assembly method thereof.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a flat panel type image device includes an image display panel displaying an image, a panel guide having a loading part, on a front surface thereof, to which the image display panel is attached, and a side surface part bent from the loading part such that a plurality of first fixing holes and a plurality of second fixing holes having different structures and different sizes are alternately disposed on the side surface part, and a bottom case covering the opened rear surface of the panel guide including the rear surface of the image display panel, having a plurality of first protruding fixing parts and a plurality of second protruding fixing parts having different structures and different sizes and alternately disposed on side surfaces thereof, and fixed to the inside of the panel guide.

The plurality of first protruding fixing parts of the bottom case may be respectively coupled with the plurality of first fixing holes of the panel guide, and the plurality of second protruding fixing parts of the bottom case may be respectively coupled with the plurality of second fixing holes of the panel guide.

Each first protruding fixing part of the bottom case may be formed by cutting a part of the side surface of the bottom case and protruding the cut part in the direction of the side surface of the bottom case and be coupled with and inserted into the corresponding first fixing hole from the inside of the first fixing hole in the outward direction and fixes the first fixing hole so as not to move in at least one of x-axis, y-axis, and z-axis directions.

Each second protruding fixing part of the bottom case may be formed by cutting a part of the side surface of the bottom case and bending the cut part at least one time in the direction of the side surface and the direction to the front surface of the bottom case so as to protrude in the direction of the side surface of the bottom case and be coupled with and inserted into the corresponding second fixing hole from the inside of the second fixing hole in the outward direction so that the inner surface of the second protruding fixing part contacts and is fixed to the outer surface of the side surface part of the panel guide.

A stepped part corresponding to a part of the inner surface of the second protruding fixing part may be formed within the second fixing hole, and the inner surface of the second protruding fixing part, coupled with and inserted into the second fixing hole from the inside of the second fixing hole in the outward direction, may contact and be coupled with the outer surface of the stepped part.

In another aspect of the present invention, an assembly method of a flat panel type image device includes preparing a panel guide having a loading part on a front surface thereof to receive an image display panel and a side surface part bent from the loading part such that a plurality of first fixing holes and a plurality of second fixing holes having different structures and different sizes are alternately disposed on the side surface part, fixing a bottom case, covering the opened rear surface of the panel guide including the rear surface of the image display panel and having a plurality of first protruding fixing parts and a plurality of second protruding fixing parts having different structures and different sizes and alternately disposed on side surfaces thereof, to the inside of the panel guide, and attaching the image display panel displaying an image to the loading part of the panel guide.

The fixation of the bottom case to the inside of the panel guide may include respectively coupling the plurality of first protruding fixing parts of the bottom case with the plurality of first fixing holes of the panel guide and respectively coupling the plurality of second protruding fixing parts of the bottom case with the plurality of second fixing holes of the panel guide.

Each first protruding fixing part of the bottom case may be formed by cutting a part of the side surface of the bottom case and protruding the cut part in the direction of the side surface of the bottom case and be coupled with and inserted into the corresponding first fixing hole from the inside of the first fixing hole in the outward direction and fixes the first fixing hole so as not to move in at least one of x-axis, y-axis, and z-axis directions.

Each second protruding fixing part of the bottom case may be formed by cutting a part of the side surface of the bottom case and bending the cut part at least one time in the direction of the side surface and the direction to the front surface of the bottom case so as to protrude in the direction of the side surface of the bottom case and be coupled with and inserted into the corresponding second fixing hole from the inside of the second fixing hole in the outward direction so that the inner surface of the second protruding fixing part contacts and is fixed to the outer surface of the side surface part of the panel guide.

A stepped part corresponding to a part of the inner surface of the second protruding fixing part may be formed within the second fixing hole, and the inner surface of the second protruding fixing part, coupled with and inserted into the second fixing hole from the inside of the second fixing hole in the outward direction, may contact and be coupled with the outer surface of the stepped part.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Hereinafter, a flat panel type image display device and an assembly method thereof in accordance with one embodiment of the present invention will be described with reference to the accompanying drawings.

In the present invention, as flat panel type image display devices, in addition to a liquid crystal display device and an organic light emitting display device, a plasma display panel and a field emission display device may be employed. Although technical features of the present invention may be applied to all the above-described flat panel type image display devices, one example of a liquid crystal display device to which technical features of the present invention are applied will be described hereinafter.

Figure 1:
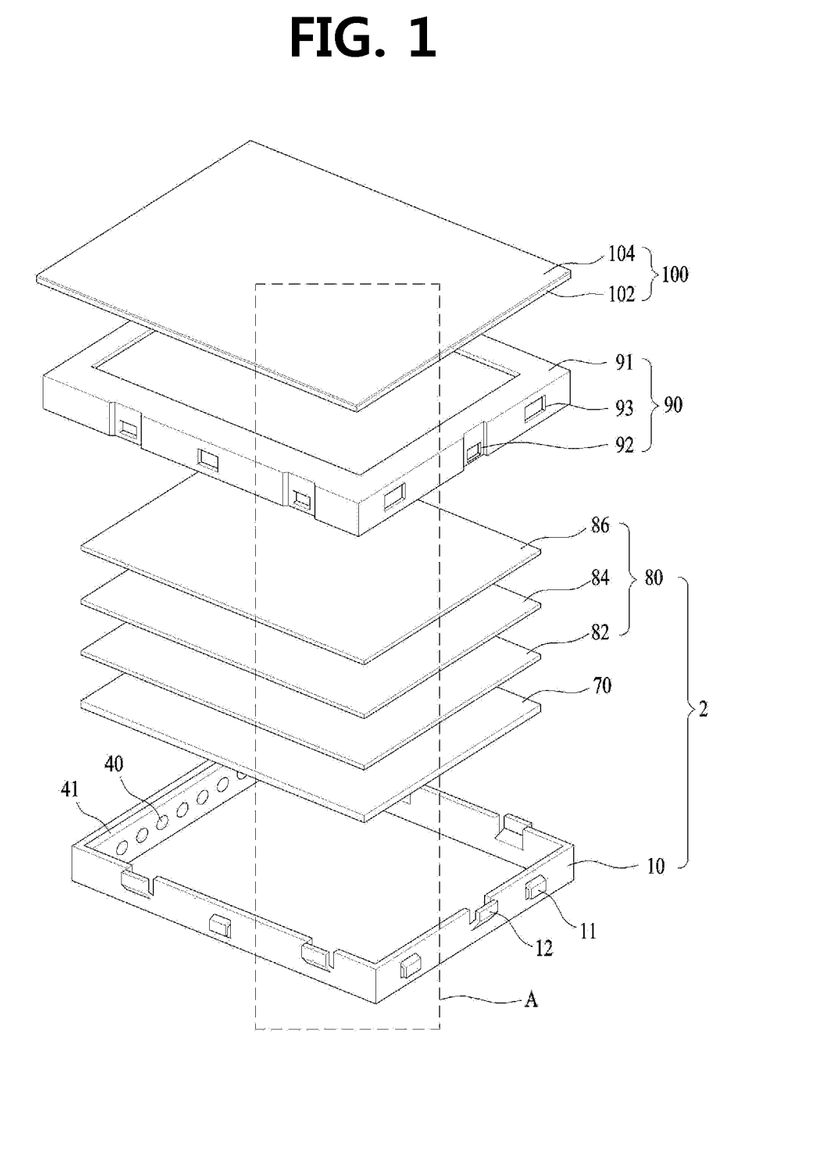
FIG. 1 is an exploded perspective view schematically illustrating a flat panel type image display device in accordance with one embodiment of the present invention.
Figure 2:
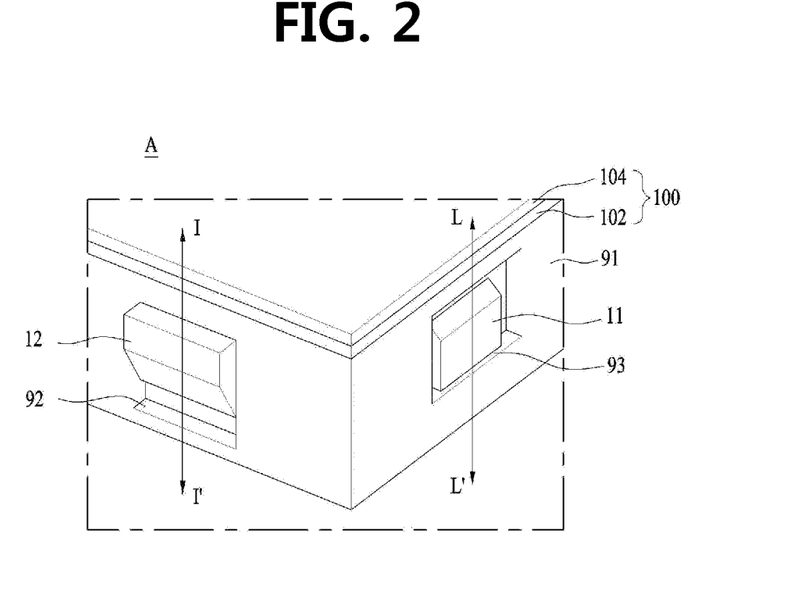
FIG. 2 is a perspective view illustrating the portion "A" of the flat panel type image display device of FIG. 1 in an assembled state.

FIG. 1 is an exploded perspective view schematically illustrating a flat panel type image display device in accordance with one embodiment of the present invention. Further, FIG. 2 is a perspective view illustrating the portion "A" of the flat panel type image display device of FIG. 1 in an assembled state.

The flat panel type image display device shown in FIG. 1, for example, a liquid crystal display device, includes a liquid crystal panel 100 displaying an image, a panel guide 90 having a front surface loading part to which the liquid crystal panel 100 is attached and a side surface part bent from the loading part such that a plurality of first fixing holes 93 and a plurality of second fixing holes 92 having different structures and different sizes are alternately disposed on the side surface part, a bottom case 10 covering the opened rear surface of the panel guide 90 including the rear surface of the liquid crystal panel 100, having a plurality of first protruding fixing parts 11 and a plurality of second protruding fixing parts 12 having different structures and different sizes are alternately disposed on a side surface part thereof, and fixed to the inner side surfaces of the panel guide 90, and a backlight unit 2 received in the bottom case 10 and emitting light to the rear surface of the liquid crystal panel 100.

The rear surface edge part of the liquid crystal panel 100 is attached to the front surface loading part of the panel guide 90, adjusts transmittance of light emitted from the backlight unit 2, and displays an image. For this purpose, the liquid crystal panel 100 includes a lower substrate 102, an upper substrate 104, liquid crystals (not shown) formed between the lower substrate 102 and the upper substrate 104, and spacers (not shown) maintaining a uniform interval between the lower substrate 102 and the upper substrate 104.

The upper substrate 104 includes color filters, a black matrix, and a common electrode.

The lower substrate 102 includes thin film transistors formed at cell areas defined by data lines and gate lines and pixel electrodes connected to the thin film transistors. The thin film transistors supply image signals supplied from the data lines to the pixel electrodes in response to gate on voltage supplied from the gate lines. Here, the common electrode formed on the upper substrate 104 may be formed on the lower substrate 102 according to modes of the liquid crystals.

The panel guide 90 is mounted on the backlight unit 2, i.e., on the front and side surfaces of the bottom case 10, so as to surround the front surface and side surfaces of the outer wall of the bottom case 10.

The panel guide 90 includes a panel loading part 91 formed on a flat surface thereof corresponding to the rear surface edge part of the liquid crystal panel 100 so that the rear surface edge part of the liquid crustal panel 100 is attached to the panel loading part 91 by adhesive elements, and a side surface part bent from the panel loading part 91 in the direction of the rear surface of the guide panel 90 and extending in the direction of the rear surface of the guide panel 90. The inner surface of the panel guide 90 is opened except for the panel loading part 91 on which the liquid crystal panel 100 is loaded and the side surface part. That is to say, the panel guide 90 may be formed in a shape having only the loading part (an edge frame) at the edge of the front surface on which the liquid crystal panel 100 is loaded and the side surface part (a side frame), i.e., formed in a rectangular frame shape, the front surface and the rear surface of which are opened. Further, the first fixing holes 93 and the second fixing holes 92 having different structures and different sizes are alternately disposed on the side surface part of the panel guide 90.

When the flat panel type image display device is assembled, the panel guide 90 surrounds the edge and side surfaces of the backlight unit 2, i.e., all the side surfaces of the bottom case 10 in which a light guide panel 70 and optical sheets 80 are received, as exemplarily shown in FIG. 2. Here, the first protruding fixing parts 11 of the bottom case 10 are respectively coupled with the first fixing holes 93 of the panel guide 90. Further, the second protruding fixing parts 12 of the bottom case 10 are respectively coupled with the second fixing holes 92 of the panel guide 90.

The panel guide 90 may be formed of a material, such as metal, so as to improve heat radiation effects, and be formed of a material, such as plastic or a mold, so as to reduce the weight of the panel guide 90. Such a panel guide 90 will be described in more detail with reference to the accompanying drawings.

The backlight unit 2 includes a plurality of lamps 40, lamp fixing units 41, on which the plurality of lamps 40 is mounted, fixedly disposed within the bottom case 10, the light guide panel 70 emitting light from the respective lamps 40 in the forward direction, and a plurality of optical sheets 80 disposed on the light guide panel 70 and emitting light perpendicularly from the light guide panel 70 and the incident surfaces thereof.

Each of the lamps 40 is mounted on the lamp fixing unit 41 so as to be detachably attached to the lamp fixing unit 41 and is located so as to be opposite the side surface or the rear incident surface of the light guide panel 70 and the side surface or the rear incident surface of at least one of the optical sheets 80. Here, light emitting diodes 40 may be used as the lamps 40. The lamps 40 are turned on by lamp operating power supplied through each lamp fixing unit 41 and emit light to the light guide panel 70 and the incident surfaces of the respective optical sheets 80.

The lamp fixing unit 41 provided with the plural lamps 40 is installed within the bottom case 10 and supplies lamp operating power transmitted from the outside to the plural lamps 40.

The light guide panel 70 is stacked on an opening formed on the front surface of the bottom case 10, i.e., the inner bottom surface of the bottom case 10. Such a light guide panel 70 changes a proceeding path of light emitted to the side surface or the rear incident surface and diffuses the light to all areas of the liquid crystal panel 100.

The plural optical sheets 80 adjust a light path so that incident light diffused through the light guide panel 70 is emitted perpendicularly to the liquid crystal panel 100. For this purpose, the plural optical sheets 80 include at least one of a prism sheet 82, a diffuser sheet 84, a polarizing sheet 84, and a protection sheet (not shown) to condense light diffused by the light guide panel 70.

The bottom case 10 includes a lower surface disposed opposite the liquid crystal panel 100 or the optical sheets 80, inner side surfaces configured such that the lamps 40 may be arranged on the inner side surfaces and the light guide panel 70 and the optical sheets 80 may be fixedly received in the bottom case 10, and a loading part extending from the inner side surfaces so as to be opposite the lower bottom surface. A reflective sheet (not shown) to reflect light emitted from the respective lamps 40 toward the liquid crystal panel 100, i.e., the front surface of the liquid crystal panel 100, is further formed on the lower bottom surface and the inner side surfaces of the bottom case 10.

The bottom case 10, as exemplarily shown in FIG. 1, is formed in a rectangular frame shape, and the plural first protruding fixing parts 11 corresponding to the first fixing holes 93 of the panel guide 90 and the plural second protruding fixing parts 12 corresponding to the second fixing holes 92 of the panel guide 90 are formed on the outer walls of the side surfaces of the bottom case 10.

When the flat panel type image display device is assembled, the first protruding fixing parts 11 of the bottom case 10 are respectively coupled with the first fixing holes 93 of the panel guide 90. Further, the second protruding fixing parts 12 of the bottom case 10 are respectively coupled with the second fixing holes 92 of the panel guide 90.

Figure 3:
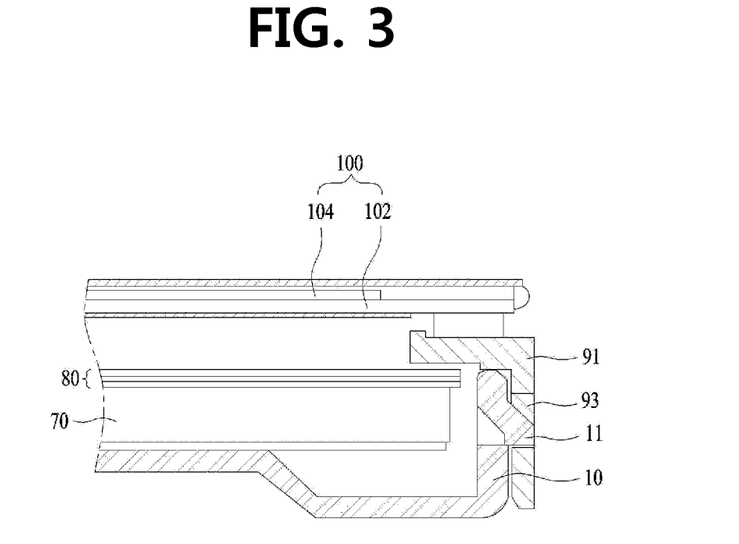
FIG. 3 is a cross-sectional view taken along line L-L' of FIG. 2.
Figure 4:
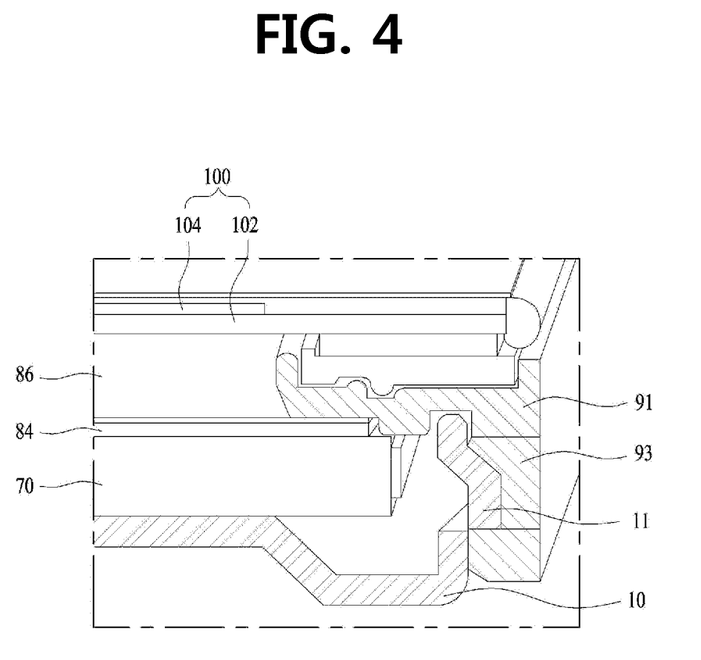
FIG. 4 is a perspective view illustrating the cross-section taken along line L-L' of FIG. 2.

FIG. 3 is a cross-sectional view taken along line L-L' of FIG. 2 and FIG. 4 is a perspective view illustrating the cross-section taken along line L-L' of FIG. 2.

With reference to FIGS. 1 to 4, when the flat panel type image display device is assembled, particularly, when the bottom case 10, in which the light guide panel 70 and the optical sheets 80 are received, and the panel guide 90 are coupled, the bottom case 10 is inserted into the panel guide 90 in the upward direction. At this time, the first protruding fixing parts 11 of the bottom case 10 are respectively coupled with the first fixing holes 93 of the panel guide 90. Further, the second protruding fixing parts 12 of the bottom case 10 are respectively coupled with the second fixing holes 92 of the panel guide 90.

As exemplarily shown in FIGS. 3 and 4, each first protruding fixing part 11 of the bottom case 10 may be formed by cutting a part of the side surface of the bottom case 10 and protruding the cut part in the direction of the side surface of the bottom case 10, and be coupled with and inserted into the first fixing hole 93 from the inside of the first fixing hole 93 in the outward direction and fix the first fixing hole 93 so as not to move in at least one of x-axis, y-axis, and z-axis directions.

For example, if the width, the area, and the height of the first protruding fixing part 11 is the same as the inner diameter, the area, and width of the first fixing hole 93, the first protruding fixing part 11 may fix the first fixing hole 93 so as not to move in any one of x-axis, y-axis, and z-axis directions.

The contact area between the rear surface of the panel loading part 91 of the panel guide 90 and the front surface of the optical sheet 80, the contact area between the side surfaces of the panel guide 90 having the first fixing holes 93 and the side surfaces of the bottom case 10, the coupling area between the first protruding fixing parts 11 and the first fixing holes 93, and the thicknesses of the panel guide 90 and the bottom case 10 affect durability of the coupling structure between the first protruding fixing parts 11 and the first fixing holes 93. Therefore, only if the contact area between the rear surface of the panel loading part 91 of the panel guide 90 and the front surface of the optical sheet 80 and the coupling area between the first protruding fixing parts 11 and the first fixing holes 93 are maintained and fixed, durability of the coupling structure between the first protruding fixing parts 11 and the first fixing holes 93 may be increased.

Figure 5:
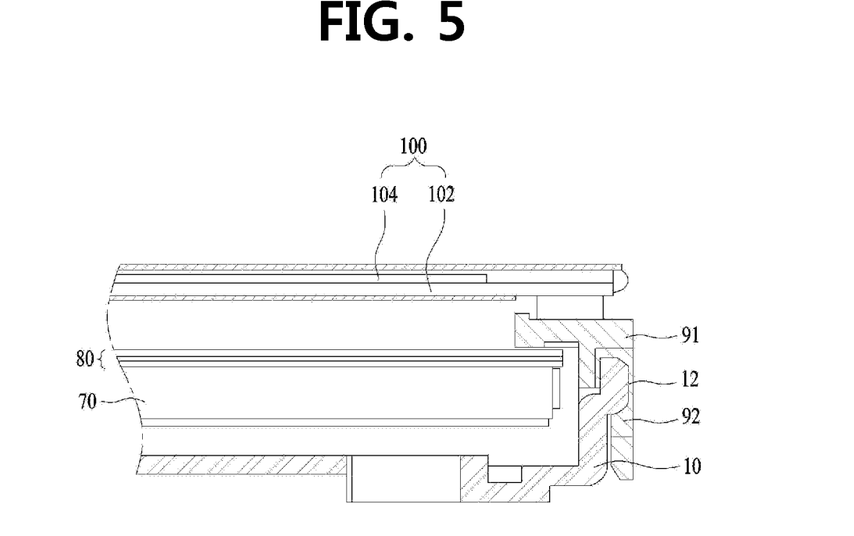
FIG. 5 is a cross-sectional view taken along line I-I' of FIG. 2.
Figure 6:
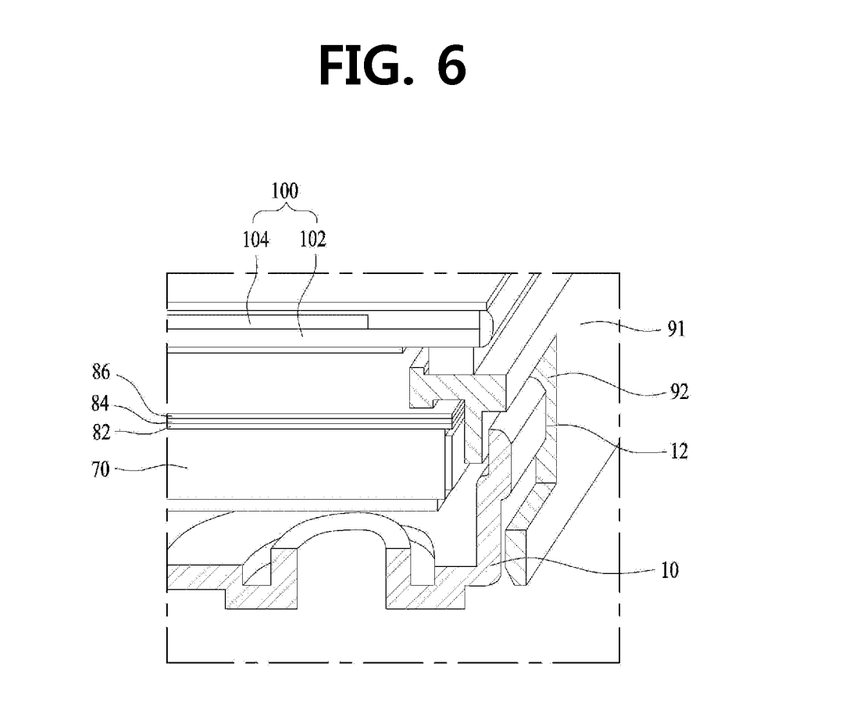
FIG. 6 is a perspective view illustrating the cross-section taken along line I-I' of FIG. 2.

FIG. 5 is a cross-sectional view taken along line I-I' of FIG. 2 and FIG. 6 is a perspective view illustrating the cross-section taken along line I-I' of FIG. 2.

With reference to FIGS. 5 and 6, when the flat panel type image display device is assembled, particularly, when the bottom case 10 and the panel guide 90 are coupled, the bottom case 10 is inserted into the panel guide 90 in the upward direction. At this time, the second protruding fixing parts 12 of the bottom case 10 are respectively coupled with the second fixing holes 92 of the panel guide 90.

Each second protruding fixing part 12 of the bottom case 10 may be formed by cutting a part of the side surface of the bottom case 10 and bending the cut part at least one time in the direction of the side surface and the direction to the front surface of the bottom case 10 so as to protrude in the direction of the side surface of the bottom case 10. Each second protruding fixing part 12 is coupled with and inserted into the second fixing hole 92 from the inside of the second fixing hole 92 in the outward direction and thus, the inner surface of the second protruding fixing part 12 contacts and is fixed to the outer surface of the side surface part of the panel guide 90.

The second protruding fixing part 12 fixes the second fixing hole 92 so as not to move in at least one of x-axis, y-axis, and z-axis directions, and fixes the inner surface of the side surface part of the panel guide 90 having the second fixing holes 92 so as not to be separated from the outer surface of the side surface part of the bottom case 10 or be taken off in the outward direction.

Further, a stepped surface corresponding to a part of the inner surface of the second protruding fixing part 12 is formed within the second fixing hole 92 and thus, the inner surface of the second protruding fixing part 12 coupled with and inserted into the second fixing hole 92 from the inside of the second fixing hole 92 in the outward direction may contact and be coupled with the stepped surface. If the above-described stepped surface is formed within the second fixing hole 92, the second protruding fixing part 12 may not protrude from the side surface part of the panel guide 90.

Figure 7:
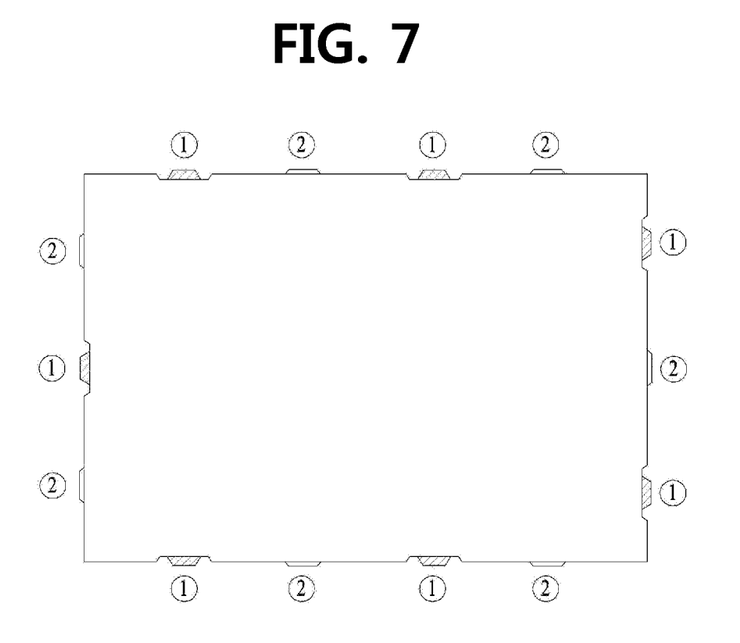
FIG. 7 is a view illustrating coupling positions between first and second protruding fixing parts and first and second fixing holes in accordance with the embodiment of the present invention.

FIG. 7 is a view illustrating coupling positions between the first and second protruding fixing parts and the first and second fixing holes in accordance with the embodiment of the present invention.

The contact area between the rear surface of the panel loading part 91 of the panel guide 90 and the front surface of the optical sheet 80, the contact area between the side surfaces of the panel guide 90 and the side surfaces of the bottom case 10, the coupling areas between the first and second protruding fixing parts 11 and 12 and the first and second fixing holes 93 and 92, and the thicknesses of the panel guide 90 and the bottom case 10 affect durability of the coupling structure between the bottom case 10 and the panel guide 90. Particularly, only if the contact area between the side surfaces of the panel guide 90 and the side surfaces of the bottom case 10 and the coupling areas between the first and second protruding fixing parts 11 and 12 and the first and second fixing holes 93 and 92 are maintained and fixed, durability of the coupling structure between the bottom case 10 and the panel guide 90 may be increased.

That is, when the thicknesses of the panel guide 90 and the bottom case 10 and the coupling area between the first protruding fixing parts 11 and the first fixing holes 93 are reduced according to light weight and slimness trends, durability of the bottom case 10 and the panel guide 90 is reduced. For example, even if small impact or load is applied to the bottom case 10 and the panel guide 90, the side surface part of the panel guide 90 having the first fixing holes 93 may be separated from the side surfaces of the bottom case 10 having the first protruding fixing parts 11 or taken off in the outward direction.

However, in the coupling structure between the second protruding fixing parts 12 and the second fixing holes 92 of the present invention, the inner surfaces of the second protruding fixing parts 12 contact and are fixed to the outer surface of the side surface part of the panel guide 90 and thus, separation of the inner surface of the panel guide 90 from the side surface part of the bottom case 10 or taking off of the panel guide 90 in the outward direction may be prevented.

Therefore, as exemplarily shown in FIG. 7, when the coupling positions ② between the first protruding fixing parts 11 and the first fixing holes 93 and the coupling positions ① between the second protruding fixing parts 12 and the second fixing holes 92 are alternately disposed, coupling force between the panel guide 90 and the bottom case 10 and durability of the panel guide 90 and the bottom case 10 may be increased and product reliability may be enhanced.

As apparent from the above description, a flat panel type image display device and an assembly method thereof in accordance with one embodiment of the present invention improve a coupling structure between a panel guide and a bottom case in a clear borderless design and thus increase coupling force therebetween and durability of panel guide and the bottom case and enhance product reliability.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A flat panel type image display device comprising:
an image display panel displaying an image;
a panel guide having a loading part, on a front surface thereof, to which the image display panel is attached, and a side surface part bent from the loading part such that a plurality of first fixing holes and a plurality of second fixing holes spaced separately from the first fixing holes are alternately disposed on the side surface part, wherein the first fixing holes and the second fixing holes have different structures and different sizes from one another; and
a bottom case covering an opened rear surface of the panel guide including a rear surface of the image display panel, the bottom case having a plurality of first protruding fixing parts and a plurality of second protruding fixing parts spaced separately from the plurality of first protruding fixing parts, wherein the plurality of first protruding fixing parts and the plurality of second protruding fixing parts have different structures and different sizes from one another and are alternately disposed on side surfaces of the bottom case, wherein the bottom case is fixed to the inside of the panel guide, and wherein the side surface part of the panel guide completely surrounds a perimeter of the side surfaces of the bottom case including the plurality of first and second protruding fixing parts of the bottom case.

2. The flat panel type image display device according to claim 1, wherein:

the plurality of first protruding fixing parts of the bottom case are respectively coupled with the plurality of first fixing holes of the panel guide; and the plurality of second protruding fixing parts of the bottom case are respectively coupled with the plurality of second fixing holes of the panel guide.

3. The flat panel type image display device according to claim 2, wherein each first protruding fixing part of the bottom case:

is formed by cutting a part of the side surface of the bottom case and protruding the cut part in the direction of the side surface of the bottom case; and is coupled with and inserted into the corresponding first fixing hole from the inside of the first fixing hole in the outward direction and fixes the first fixing hole so as not to move in at least one of x-axis, y-axis, and z-axis directions.

4. The flat panel type image display device according to claim 3, wherein each second protruding fixing part of the bottom case:

is formed by cutting a part of the side surface of the bottom case and bending the cut part at least one time in the direction of the side surface and the direction to the front surface of the bottom case so as to protrude in the direction of the side surface of the bottom case; and is coupled with and inserted into the corresponding second fixing hole from the inside of the second fixing hole in the outward direction so that the inner surface of the second protruding fixing part contacts and is fixed to the outer surface of the side surface part of the panel guide.

5. The flat panel type image display device according to claim 4, wherein:

a stepped part corresponding to a part of the inner surface of the second protruding fixing part is formed within the second fixing hole; and the inner surface of the second protruding fixing part, coupled with and inserted into the second fixing hole from the inside of the second fixing hole in the outward direction, contacts and is coupled with the outer surface of the stepped part.

6. The flat panel type image display device according to claim 1, wherein the plurality of first protruding fixing parts and the plurality of second protruding fixing parts are formed on outer walls of the side surfaces of the bottom case.

7. The flat panel type image display device according to claim 1, further comprising a backlight unit arranged in the bottom case and emitting light to the rear surface of the image display panel.

8. The flat panel type image display device according to claim 7, wherein the backlight unit includes a plurality of lamps mounted on lamp fixing units arranged on inner side surfaces of the bottom case and opposite a light guide panel.

9. The flat panel type image display device according to claim 7, wherein the panel guide surrounds an edge and side surfaces of the back light unit including the bottom cover.

10. The flat panel type image display device according to claim 5, wherein the second protruding fixing part does not protrude from the side surface part of the panel guide.

\* \* \* \* \*